(12) United States Patent
Aruga et al.

(10) Patent No.: US 8,391,724 B2
(45) Date of Patent: Mar. 5, 2013

(54) OPTICAL MODULATOR, OPTICAL TRANSMISSION DEVICE, AND BIAS ADJUSTING METHOD

(75) Inventors: Hiroshi Aruga, Tokyo (JP); Keita Mochizuki, Tokyo (JP); Atsushi Sugitatsu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 224 days.

(21) Appl. No.: 13/029,427

(22) Filed: Feb. 17, 2011

(65) Prior Publication Data

US 2012/0008963 A1 Jan. 12, 2012

(30) Foreign Application Priority Data

Jul. 8, 2010 (JP) .................................. 2010-155944

(51) Int. Cl.
*H04B 10/04* (2006.01)
(52) U.S. Cl. ........ 398/198; 398/183; 398/188; 398/185; 398/186; 398/193; 398/194; 398/195; 398/196; 398/197; 398/201; 359/279; 359/238; 359/239; 359/276; 385/1; 385/2; 385/3; 385/14; 372/32; 372/34; 372/36; 372/38.02
(58) Field of Classification Search .................. 398/183, 398/185, 186, 187, 188, 192, 193, 194, 195, 398/196, 197, 198, 200, 201, 158, 159, 160, 398/135, 136; 359/245, 237, 238, 239, 276, 359/279, 278, 247; 385/1, 2, 3, 14, 15, 129; 372/32, 34, 36, 38.02
See application file for complete search history.

(56) References Cited

U.S. PATENT DOCUMENTS

| | | | | |
|---|---|---|---|---|
| 8,095,018 | B2 * | 1/2012 | Sekine et al. | 398/198 |
| 8,121,492 | B2 * | 2/2012 | Akiyama et al. | 398/188 |
| 2008/0181620 | A1 | 7/2008 | Sasaki | |

FOREIGN PATENT DOCUMENTS

| | | |
|---|---|---|
| JP | 2008-187223 | 8/2008 |
| JP | 2008-236512 | 10/2008 |

* cited by examiner

*Primary Examiner* — Hanh Phan
(74) *Attorney, Agent, or Firm* — Oblon, Spivak, McClelland, Maier & Neustadt, L.L.P.

(57) ABSTRACT

Included are a first modulator, a second modulator, a first optical amplifier that amplifies an output of the first modulator at an amplification factor based on a first bias signal, a second optical amplifier that amplifies an output of the second modulator at an amplification factor based on a second bias signal, an optical phase adjuster that phase-rotates an output of the second optical amplifier, an optical multiplexer that multiplexes an output of the first optical amplifier with an output of the optical phase adjuster, and a second bias corrector that generates a first pulse signal and a second pulse signal, which are complementary to each other, and obtains a first bias value and a second bias value based on a change of strength of an output signal of the optical multiplexer. The first and second pulse signals are superimposed on the first and second bias signals, respectively.

9 Claims, 5 Drawing Sheets

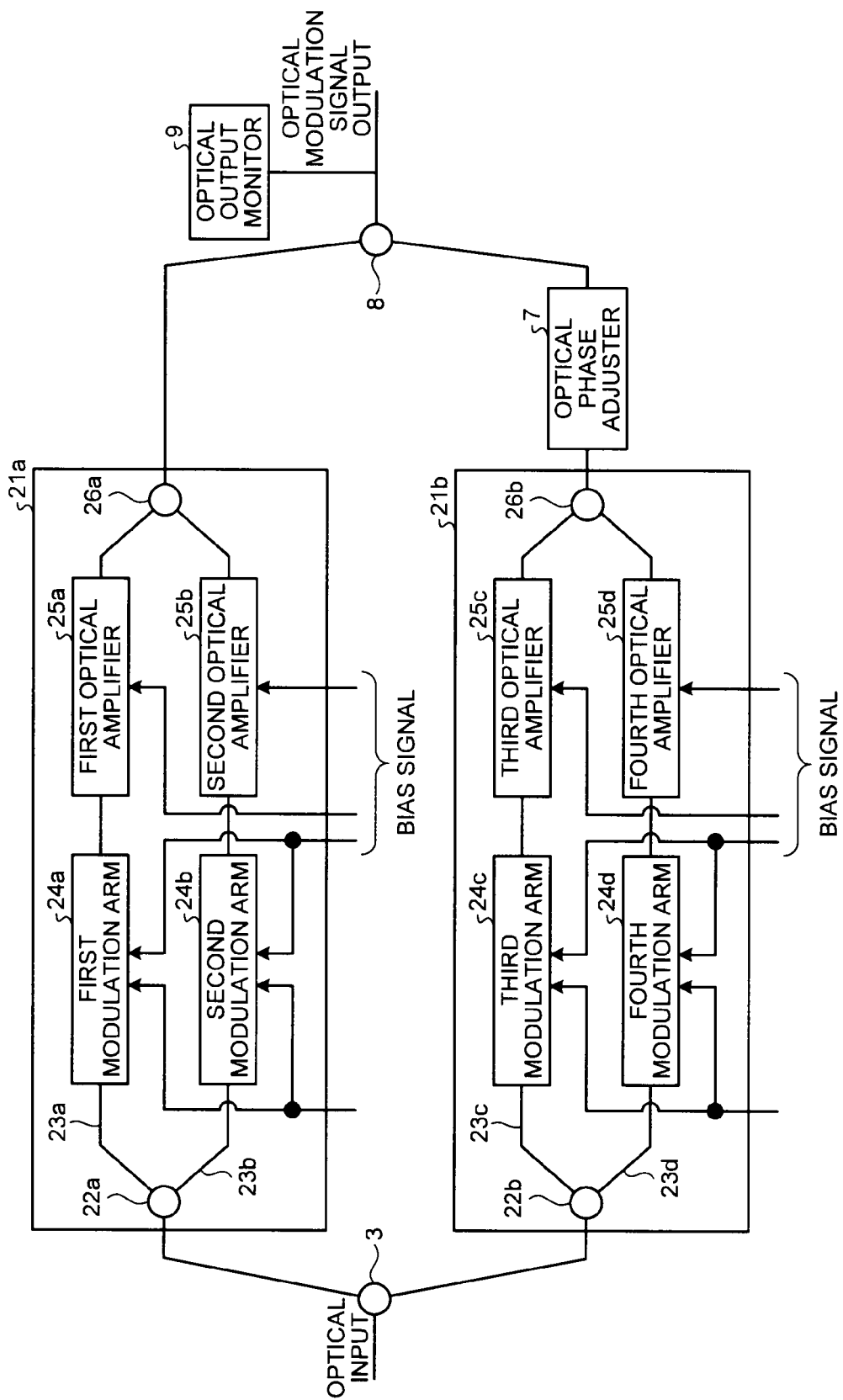

OPTICAL MODULATOR, OPTICAL TRANSMISSION DEVICE, AND BIAS ADJUSTING METHOD

BACKGROUND OF THE INVENTION

1. Field of the Invention

The present invention relates to an optical modulator, an optical transmission device, and a bias adjusting method.

2. Description of the Related Art

A conventional optical modulator that performs a Quadrature Phase Shift Keying (QPSK) modulation includes two sub-modulators (see, for example, Japanese Patent Application Laid-open No. 2008-187223 and Japanese Patent Application Laid-open No. 2008-236512). Signals of an I channel and a Q channel are input to these two sub-modulators, respectively. The two sub-modulators modulate the input signals of the I channel and the Q channel and output optical modulation signals. Among the optical modulation signals of two systems modulated by the two sub-modulators, a phase of one optical modulation signal is rotated by π/2 (90 degrees) by using an optical phase modulator. The optical modulation signal of which a phase is rotated is combined and interfered with an optical modulation signal modulated by the other sub-modulator, thereby generating a QPSK signal.

In such an optical modulator, it is important to rotate a phase by π/2 by using the optical phase modulator. Therefore, to ascertain whether a phase is correctly rotated by the optical phase adjuster, a monitor photo diode (PD) is provided in the conventional optical modulator to detect an optical modulation signal after a synthesized output by applying a signal of a low frequency pulse to a bias voltage to be applied to the sub-modulator. The optical modulator ascertains a phase state of the optical modulation signal by using the optical modulation signal detected by the monitor PD. When the optical phase adjuster is set to correctly change a phase by "π/2", the I channel and the Q channel are orthogonal to each other, and phases are offset each other and there occurs no variation in optical output power even when a phase is modulated by being applied with a low-frequency pulse signal. On the other hand, when the phase change is deviated from "π/2", a variation occurs in a level of an optical modulation signal along with a low-frequency pulse signal. A phase rotated by the optical phase adjuster is adjusted by using this operation, and a correct phase rotation can be achieved by finding an optimally adjusted amount (an adjusted amount to set a phase difference between an optical modulation signal in the I channel and an optical modulation signal in the Q channel to "π/2") and by setting the optical phase adjuster at the optimally adjusted amount.

While the sub-modulator described above is constituted in many cases by lithium niobate (LiNbO3, hereinafter, "LN"), the development of constituting a sub-modulator for an integrated modulation device using compound semiconductors has been also progressed. This integrated modulation device uses a compound semiconductor such as indium phosphide (InP) for a substrate. Optical elements such as an optical waveguide, a phase modulator, an amplifier, an optical multiplexer/demultiplexer, a laser can be formed as one unit by stacking active layers on a compound semiconductor substrate and etching unnecessary parts. A compound semiconductor substrate can be used to manufacture various elements as compared with elements made of LN, and also has an advantage of being compact as a whole. Therefore, a compact and integrated optical modulator can be formed by forming various elements in addition to a sub-modulator on a compound semiconductor substrate and by connecting these elements by an optical waveguide.

However, when an optical modulator is integrated and unified on a compound semiconductor, a loss in a sub-modulator is larger than that when a sub-modulator is formed by LN, and a variation of the loss becomes large. Therefore, a loss in an optical modulator increases, and a variation of a loss between sub-modulators becomes larger.

It is desired that an amplitude level of an optical signal in the I channel and that of an optical signal in the Q channel are equivalent. However, when there is a variation between a loss in a sub-modulator for the I channel and that in a sub-modulator for the Q channel, a difference occurs between an amplitude level of an optical modulation signal in the I channel and that of an optical modulation signal in the Q channel, and the modulation waveform quality becomes low.

SUMMARY OF THE INVENTION

It is an object of the present invention to at least partially solve the problems in the conventional technology.

According to an aspect of the present invention, there is provided an optical modulator including: a first optical modulating unit that generates a first optical modulation signal; a second optical modulating unit that generates a second optical modulation signal; a first optical amplifying unit that amplifies the first optical modulation signal at an amplification factor based on a first bias signal to be input; a second optical amplifying unit that amplifies the second optical modulation signal at an amplification factor based on a second bias signal to be input; an optical phase adjuster that rotates a phase of the optical modulation signal, which is amplified by the second optical amplifying unit, by a predetermined rotation amount and outputs the rotated optical modulation signal; an optical multiplexing unit that multiplexes an optical modulation signal amplified by the first optical amplifying unit with an optical modulation signal output from the optical phase adjuster, and outputs a multiplexed signal; an optical output monitor that detects a multiplexed signal output from the optical multiplexing unit; a pulse-signal generating unit that generates a first pulse signal of a predetermined frequency and a second pulse signal that is complementary to the first pulse signal, and outputs generated pulse signals; a bias corrector that obtains a first bias value as a value of a first bias signal corresponding to an amplification factor set in the first optical amplifying unit and a second bias value as a value of a second bias signal corresponding to an amplification factor set in the second optical amplifying unit, based on a change of strength of a multiplexed signal detected by the optical output monitor; a first bias controller that generates a first bias signal based on the first bias value, superimposes a generated first bias signal with the first pulse signal, and inputs a superimposed signal to the first optical amplifying unit; and a second bias controller that generates a second bias signal based on the second bias value, superimposes a generated second bias signal with the second pulse signal, and inputs a superimposed signal to the second optical amplifying unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is a functional configuration example of an optical modulating unit according to a third embodiment of the present invention.

DETAILED DESCRIPTION OF THE PREFERRED EMBODIMENTS

Exemplary embodiments of an optical modulator, an optical transmission device, and a bias adjusting method according to the present invention will be explained below in detail with reference to the accompanying drawings. The present invention is not limited to the embodiments.

Figure 1:
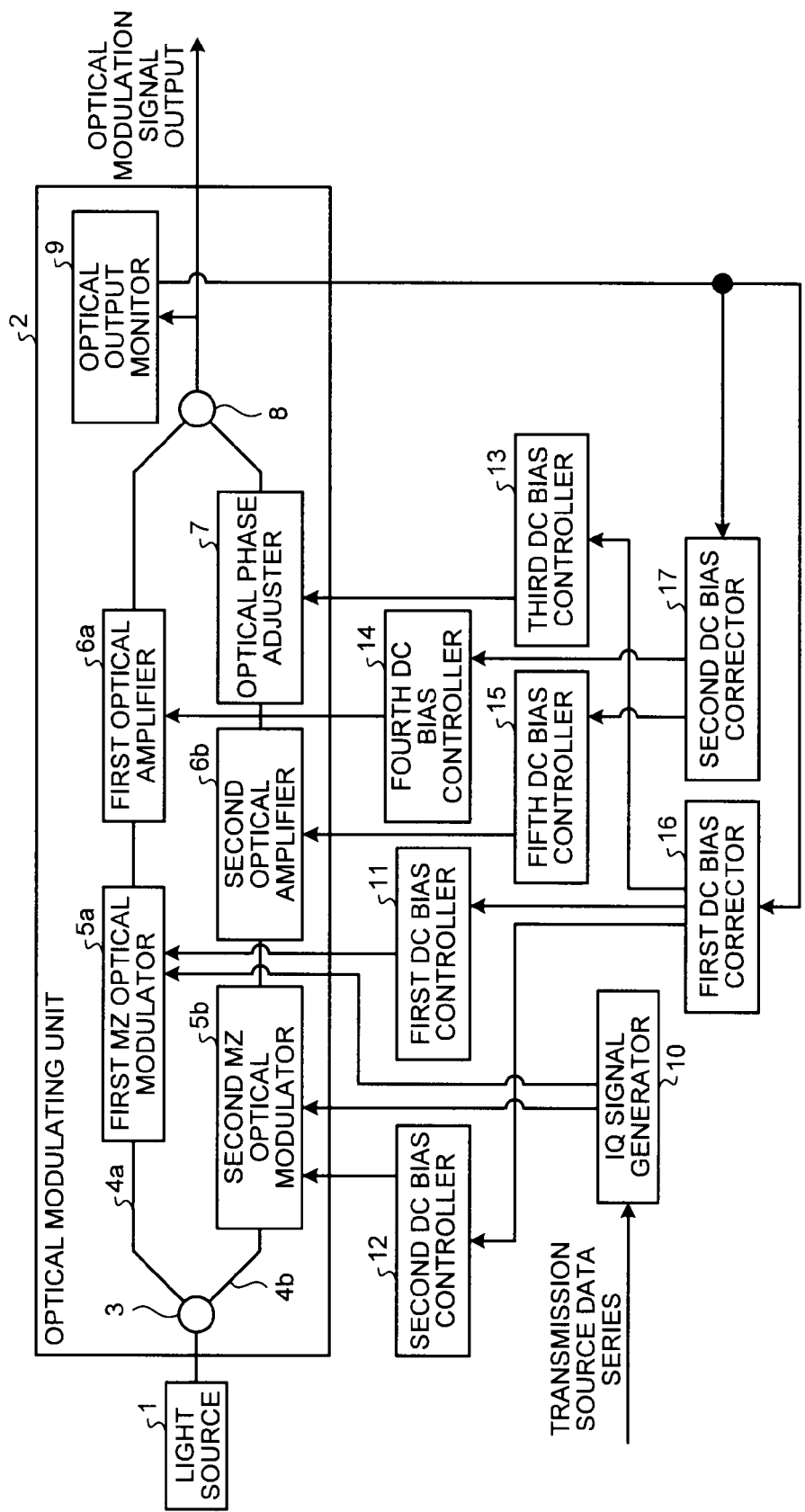
FIG. 1 is a functional configuration example of an optical modulator according to a first embodiment of the present invention.

FIG. 1 is a functional configuration example of an optical modulator according to a first embodiment of the present invention. As shown in FIG. 1, the optical modulator in the first embodiment is configured by a light source 1, an optical modulating unit 2, an IQ signal generator 10, a first direct current (DC) bias controller 11, a second DC bias controller 12, a third DC bias controller 13, a fourth DC bias controller 14, a fifth DC bias controller 15, a first DC bias corrector 16, and a second DC bias corrector 17.

The optical modulating unit 2 is configured by an optical demultiplexing unit 3, optical waveguides 4a and 4b, a first Mach-Zehnder (MZ) optical modulator 5a, a second MZ optical modulator 5b, a first optical amplifier 6a, a second optical amplifier 6b, an optical phase adjuster 7, an optical multiplexer 8, and an optical output monitor 9. Although an example of using MZ optical modulators (the first MZ optical modulator 5a, the second MZ optical modulator 5b) for sub-modulators is explained, optical modulators other than Mach-Zehnder optical modulators can be also used.

Figure 2:
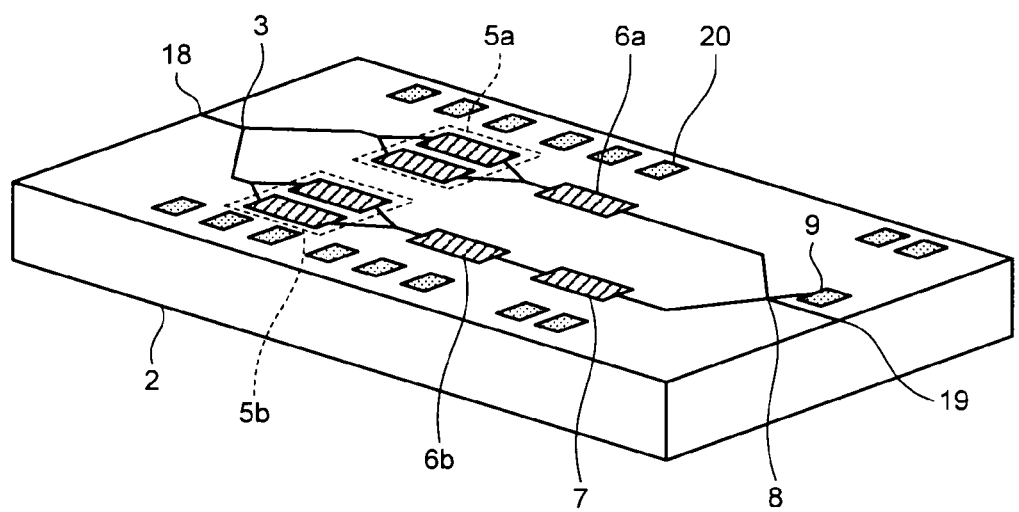
FIG. 2 is a schematic diagram of an example of an optical modulating unit according to the first embodiment mounted on a substrate.

FIG. 2 is a schematic diagram of an example of the optical modulating unit 2 according to the first embodiment mounted on a substrate. In FIG. 2, constituent elements denoted by like reference numerals as those in FIG. 1 have functions identical to those in FIG. 1. The mounted optical modulating unit 2 shown in FIG. 2 includes electric terminals 20 to connect the optical modulating unit 2 with external electric signals, optical input waveguides 18 to input optical signals from outside, and an optical output waveguide 19 to output optical signals to outside, in addition to the constituent elements shown in FIG. 1. The optical input waveguides 18 are connected to the optical demultiplexing unit 3, and output light is input from the light source 1 to the optical demultiplexing unit 3. The optical output waveguide 19 is connected to the optical multiplexer 8, and outputs optical signals that are input from the optical multiplexer 8 to outside. The schematic diagram of FIG. 2 is an implementation example, actual shapes and layouts of the constituent elements are not limited thereto, and any shape and arrangement are acceptable as far as the functional configurations of the constituent elements shown in FIG. 1 can be achieved.

Operations according to the first embodiment are explained with reference to FIGS. 1 and 2. The optical demultiplexing unit 3 demultiplexes into two signals an optical signal, which is emitted from the light source 1 and input to the own optical demultiplexing unit 3 via the optical input waveguides 18. The optical demultiplexing unit 3 outputs one of the two demultiplexed optical signals to the first MZ optical modulator 5a via the optical waveguide 4a, and outputs the other demultiplexed optical signal to the second MZ optical modulator 5b via the optical waveguide 4b.

The first MZ optical modulator 5a modulates an input optical signal based on both an I-channel modulation signal input from the IQ signal generator 10 and a bias signal (a bias current) input from the first DC bias controller 11, and outputs a modulated optical signal to the first optical amplifier 6a. The first optical amplifier 6a amplifies an optical signal, which is input from the first MZ optical modulator 5a, at an amplification factor that is determined based on a bias signal input from the fourth DC bias controller 14, and outputs an amplified optical signal to the optical multiplexer 8.

The second MZ optical modulator 5b modulates an input optical signal based on both a Q-channel modulation signal input from the IQ signal generator 10 and a bias signal input from the second DC bias controller 12, and outputs a modulated optical signal to the second optical amplifier 6b. The second optical amplifier 6b amplifies an input optical signal at an amplification factor, which is determined based on a bias signal input from the fifth DC bias controller 15, and outputs an amplified optical signal to the optical phase adjuster 7. The optical phase adjuster 7 rotates a phase of an input optical signal by "π/2" based on a bias signal input from the third DC bias controller 13, and outputs a phase-rotated optical signal to the optical multiplexer 8.

The first optical amplifier 6a and the second optical amplifier 6b determine amplification factors to be set in the optical amplifiers themselves, based on bias signals input from the fourth DC bias controller 14 and the fifth DC bias controller 15, respectively, as described above. For example, when an input bias signal is smaller than a predetermined reference value (a value corresponding to an amplification factor 1), the amplification factor is set negative, that is, an input optical signal is attenuated. When an input bias signal is larger than a predetermined reference value, the amplification factor is set positive, that is, an input optical signal is amplified. In this case, the amplification factor becomes larger when a value of a bias signal is larger. Based on this operation, it is possible to amplify at individual amplification factors an optical signal attenuated via the optical demultiplexing unit 3, the optical waveguide 4a, and the first MZ optical modulator 5a, and an optical signal attenuated via the optical demultiplexing unit 3, the optical waveguide 4b, and the second MZ optical modulator 5b.

The optical multiplexer 8 multiplexes an optical signal output from the first optical amplifier 6a with an optical signal output from the optical phase adjuster 7, and outputs a result of a multiplexed signal to outside via the optical output waveguide 19.

The IQ signal generator 10 generates modulation signals (an I-channel modulation signal, a Q-channel modulation signal) based on a data sequence to be transmitted, inputs the I-channel modulation signal to the first MZ optical modulator 5a, and inputs the Q-channel modulation signal to the second MZ optical modulator 5b. A QPSK modulation and the like can be used for a modulation system in this case. A case of using the QPSK modulation is explained below.

The optical output monitor 9 is connected to a position where an optical signal output from the optical multiplexer 8 can be detected, and the optical output monitor 9 detects the optical signal output from the optical multiplexer 8.

The first DC bias corrector 16 generates a pulse modulation signal (hereinafter, "low-frequency pulse signal") at a sufficiently lower-speed rate (low frequency) as compared to a transmission rate, and outputs the low-frequency pulse signal to the first DC bias controller 11 and the second DC bias controller 12. The first DC bias controller 11 superimposes the low-frequency pulse signal on a bias current to be applied to the first MZ optical modulator 5a, and inputs a superimposed signal to the first MZ optical modulator 5a as a bias signal. The second DC bias controller 12 superimposes the low-frequency pulse signal on a bias current to be applied to the second MZ optical modulator 5b, and inputs the superimposed signal to the second MZ optical modulator 5b as a bias signal.

When a low-frequency pulse signal is superimposed on bias currents to be applied to the first MZ optical modulator 5a and the second MZ optical modulator 5b, respectively in this way, an optical signal detected by the optical output monitor 9 does not generate an amplitude variation because an optical signal output from the first optical amplifier 6a and an optical signal output from the optical phase adjuster 7 are orthogonal to each other, when a phase rotation amount of the optical phase adjuster 7 is $\pi/2$. However, when a phase rotation amount of the optical phase adjuster 7 is deviated from $\pi/2$, an amplitude variation occurs in an optical signal detected by the optical output monitor 9.

Therefore, the first DC bias corrector 16 can control such that a phase rotation amount by the optical phase adjuster 7 is set at an optimal value ($\pi/2$) via the third DC bias controller 13 according to the magnitude of an amplitude variation of an optical signal detected by the optical output monitor 9. Specifically, the first DC bias corrector 16 determines a bias signal for controlling a phase rotation amount by the optical phase adjuster 7 at an optimal value ($\pi/2$) based on the magnitude of an amplitude variation of an optical signal detected by the optical output monitor 9, and instructs the third DC bias controller 13 to give the determined bias signal to the optical phase adjuster 7.

The second DC bias corrector 17 generates a low-frequency pulse signal in a similar manner to that of the first DC bias corrector 16, and inputs the generated signal to the fourth DC bias controller 14 and the fifth DC bias controller 15. In this case, a low-frequency pulse signal input to the fourth DC bias controller 14 and a low-frequency pulse signal input to the fifth DC bias controller 15 have the same frequency, and are set as mutually complementary signals (that is, signals having the same amplitude and having mutually opposite phases). The fourth DC bias controller 14 and the fifth DC bias controller 15 superimpose input low-frequency pulse signals, respectively on bias signals to be input to the first optical amplifier 6a and the second optical amplifier 6b, and input superimposed bias signals to the first optical amplifier 6a and the second optical amplifier 6b, respectively.

Because the first optical amplifier 6a and the second optical amplifier 6b determine amplification factors to be set in the optical amplifiers themselves based on bias signals input from the fourth DC bias controller 14 and the fifth DC bias controller 15, respectively, the amplification factors in the first optical amplifier 6a and the second optical amplifier 6b change based on low-frequency pulse signals. That is, optical signals output from the first optical amplifier 6a and the second optical amplifier 6b change based on low-frequency pulse signals that are generated by the second DC bias corrector 17, respectively.

Figure 3A:
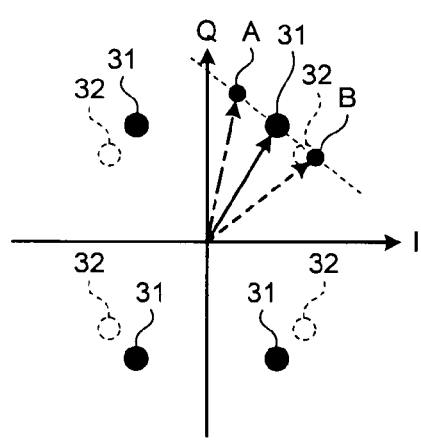
FIG. 3A is an example of, on an IQ plane, an output amplitude level of an optical signal output from an optical multiplexer when low-frequency pulse signals are superimposed.

FIG. 3A is an example of, on an IQ plane, an output amplitude level of an optical signal output from the optical multiplexer 8 when the fourth DC bias controller 14 and the fifth DC bias controller 15 superimpose low-frequency pulse signals. In FIG. 3A, data points 31 shown by black circles are an example of points showing on the IQ plane output amplitude levels of an optical signal detected by the optical output monitor 9 when low-frequency pulse signals are not superimposed before amplification factors are adjusted, and data points 32 shown by dotted-line circles show optimal data points. The data points 31 in FIG. 3A indicate a state that an amplitude level of an optical signal of an I channel is smaller than an amplitude level of an optical signal of a Q channel. The optimal data points show data points in a state that an output amplitude level of an optical signal in the I channel (an optical signal output from the first optical amplifier 6a) is equal to an output amplitude level of an optical signal in the Q channel (an optical signal output from the optical phase adjuster 7).

In FIG. 3A, the first optical amplifier 6a and the second optical amplifier 6b have the same change rate of bias signal amplification factors. That is, when bias signals are changed by the same amount, the first optical amplifier 6a and the second optical amplifier 6b have the same change rate of amplification factors.

Because both a bias signal input to the first optical amplifier 6a and a bias signal input to the second optical amplifier 6b are pulse-modulated to become mutually complementary, a value of a low-frequency pulse signal superimposed on the I channel becomes minimum when a value of a low-frequency pulse signal superimposed on the Q channel becomes maximum. A value of a low-frequency pulse signal superimposed on the Q channel becomes minimum when a value of a low-frequency pulse signal superimposed on the I channel becomes maximum. It is assumed that a point where a value of a low-frequency pulse signal superimposed on the I channel becomes minimum when a value of a low-frequency pulse signal superimposed on the Q channel becomes maximum is a pulse-modulation data point A, and that a point where a value of a low-frequency pulse signal superimposed on the Q channel becomes minimum when a value of a low-frequency pulse signal superimposed on the I channel becomes maximum is a pulse-modulation data point B. In this case, when a low-frequency pulse signal is superimposed, a data point corresponding to the data point 31 at an upper right position moves between the pulse-modulation data point A and the pulse-modulation data point B. In FIG. 3A, a part between the pulse-modulation data point A and the pulse-modulation data point B becomes a locus of data points when low-frequency pulse signals are superimposed.

The strength of an optical signal detected by the optical output monitor 9 becomes the strength corresponding to a distance from an origin of a graph in FIG. 3A. In FIG. 3A, a distance between the pulse-modulation data point A and the origin is different from a distance between the pulse-modulation data point B and the origin. Therefore, the strength of an optical signal detected by the optical output monitor 9 when the pulse-modulation data point A is taken is different from the strength of an optical signal detected by the optical output monitor 9 when the pulse-modulation data point B is taken.

Figure 3B:
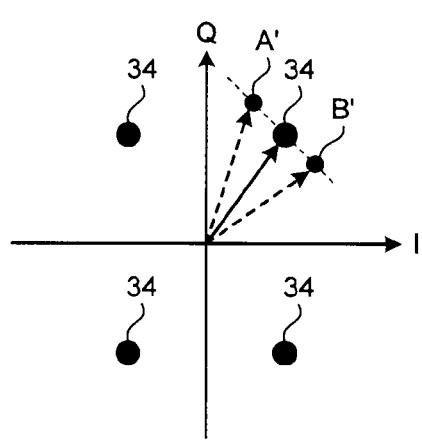
FIG. 3B is an example of, on an IQ plane, an output amplitude level of an optical signal output from the optical multiplexer when low-frequency pulse signals are superimposed after amplitude levels are adjusted.

On the contrary, when an output amplitude level of an optical signal in the I channel and an output amplitude level of an optical signal in the Q channel are adjusted such that the optimal data point 32 is taken, the strength detected by the optical output monitor 9 does not change even when low-frequency pulse signals are superimposed. FIG. 3B is an example of, on an IQ plane, an output amplitude level of an optical signal output from the optical multiplexer 8 when the fourth DC bias controller 14 and the fifth DC bias controller 15 superimpose low-frequency pulse signals after amplitude levels are adjusted.

Adjusted data points 34 are those of an output amplitude level of an optical signal, which is output from the optical multiplexer 8, after the data points are adjusted to match the optimal data points 32 (such that an output amplitude level of an optical signal in the I channel becomes equal to an output amplitude level of an optical signal in the Q channel). When a low-frequency pulse signal is superimposed, a data point corresponding to the adjusted data point 34 at an upper right position moves alternately between a pulse-modulation data point A' (a point where a value of a low-frequency pulse signal superimposed on the I channel becomes minimum when a value of a low-frequency pulse signal superimposed on the Q channel becomes maximum) and a pulse-modulation data point B' (a point where a value of a low-frequency pulse signal superimposed on the Q channel becomes minimum when a value of a low-frequency pulse signal superimposed on the I channel becomes maximum).

In the example of FIG. 3B, because the adjusted data point 34 is adjusted to match the optimum data point 32 before a low-frequency pulse signal is superimposed, a distance between the pulse-modulation data point A' and the origin becomes equal to a distance between the pulse-modulation data point B' and the origin.

Figure 4A:
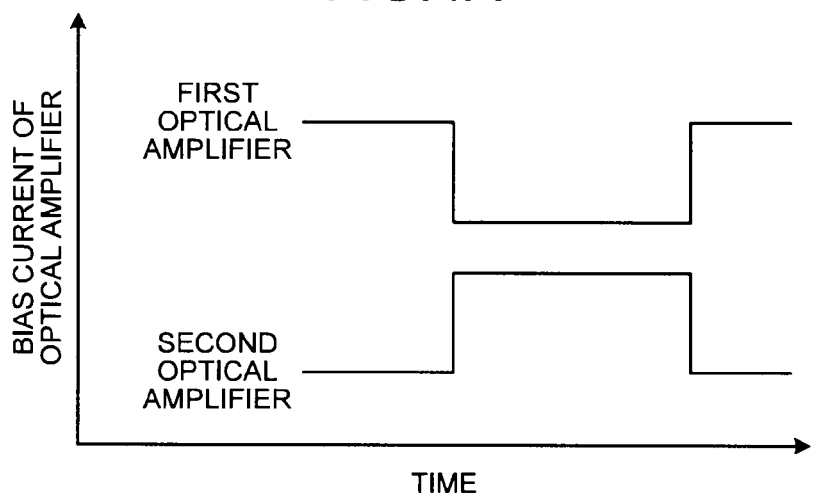
FIG. 4A is an example of a bias signal input to a first optical amplifier and a bias signal input to a second optical amplifier, which are pulse-modulated such that these bias signals become complementary to each other.

FIG. 4A is an example of a bias signal input to the first optical amplifier 6a and a bias signal input to the second optical amplifier 6b, which are pulse-modulated such that these bias signals become complementary to each other. A bias signal input to the first optical amplifier 6a is shown at an upper part of FIG. 4A, and a bias signal input to the second optical amplifier 6b is shown at a lower part of FIG. 4A. As shown in FIG. 4A, a bias signal input to the second optical amplifier 6b becomes a minimum value in a period when a bias signal input to the first optical amplifier 6a becomes a maximum value, and a bias signal input to the second optical amplifier 6b becomes a maximum value in a period when a bias signal input to the first optical amplifier 6a becomes a minimum value.

Figure 4B:
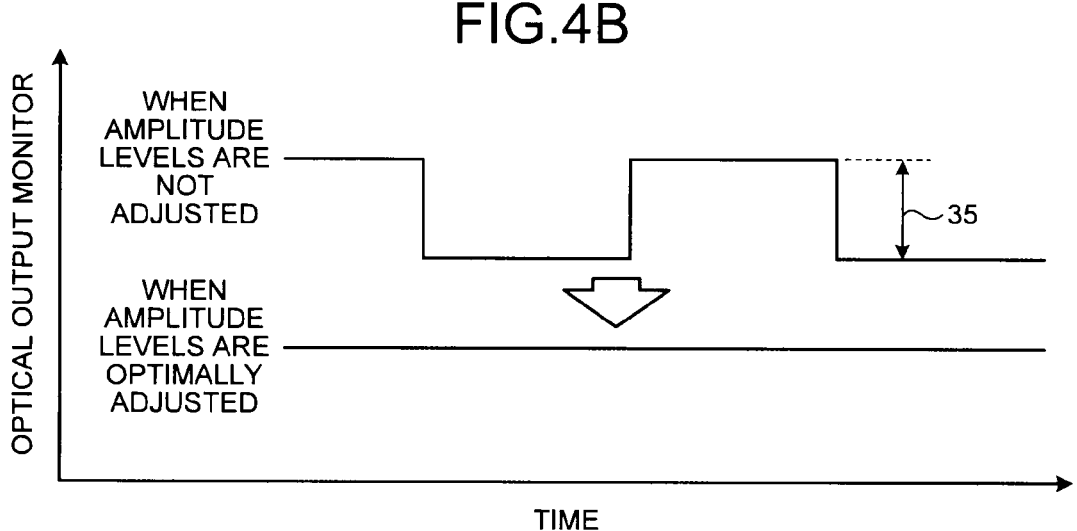
FIG. 4B is an example of strength of an optical signal detected by an optical output monitor.

FIG. 4B is an example of strength of an optical signal detected by the optical output monitor 9. Shown at an upper part of FIG. 4B is the strength of an optical signal before output amplitude levels are adjusted such that an output amplitude level of an optical signal in the I channel becomes equal to an output amplitude level of an optical signal in the Q channel. The strength of an optical signal after the adjustment is shown at a lower part of FIG. 4B. When output amplitude levels are not adjusted and when there is a difference between an output amplitude level of an optical signal in the I channel and an output amplitude level of an optical signal in the Q channel, the strength of an optical signal detected by the optical output monitor 9 varies in a frequency of a low-frequency pulse signal as shown at the upper side of FIG. 4B. That is, an amplitude difference 35 is generated between a maximum value and a minimum value of the optical signal strength detected by the optical output monitor 9.

On the other hand, when output amplitude levels are adjusted such that an output amplitude level of an optical signal in the I channel becomes equal to an output amplitude level of an optical signal in the Q channel as shown at the lower part of FIG. 4B, no difference occurs between a maximum value and a minimum value of the strength of an optical signal detected by the optical output monitor 9.

The second DC bias corrector 17 determines levels of bias signals (bias signals excluding a component of a low-frequency pulse signal) to be input to the first optical amplifier 6a and the second optical amplifier 6b such that there is no amplitude change of an optical signal detected by the optical output monitor 9 (such that the amplitude difference 35 becomes zero), in a state that complementary low-frequency pulse signals are superimposed on bias signals input to the first optical amplifier 6a and the second optical amplifier 6b. Furthermore, the second DC bias corrector 17 instructs the determined levels to the fourth DC bias controller 14 and the fifth DC bias controller 15, respectively. Therefore, the second DC bias corrector 17 can set an output amplitude level of an optical signal in the I channel equal to an output amplitude level of an optical signal in the Q channel. After determining the levels of the bias signals in this way, the second DC bias corrector 17 stops inputting a low-frequency pulse signal to the fourth DC bias controller 14 and the fifth DC bias controller 15.

Actually, the amplitude difference 35 may not completely zero because of noise and the like. Therefore, considering noise and the like, a level of a bias signal can be determined such that the amplitude difference 35 becomes equal to or smaller than a predetermined threshold value, or a level of a bias signal is determined such that an average value of the amplitude difference 35 becomes minimum during a certain period.

Any method can be used to determine a level of a bias signal to be input to the first optical amplifier 6a and the second optical amplifier 6b such that there is no amplitude change of an optical signal detected by the optical output monitor 9. For example, one of a bias signal input to the first optical amplifier 6a and a bias signal input to the second optical amplifier 6b is increased. When an amplitude change of an optical signal detected by the optical output monitor 9 becomes larger than that before the increase, the increased value is returned to an original value, and the other value is increased. When an amplitude change of an optical signal detected by the optical output monitor 9 becomes smaller than that before the increase, a value of a bias signal level at which an amplitude change of an optical signal detected by the optical output monitor 9 becomes zero can be searched by further increasing or reducing the increased value.

The first DC bias corrector 16 also performs a phase adjustment by using a low-frequency pulse signal. Therefore, the first DC bias corrector 16 and the second DC bias corrector 17 have a possibility of giving an influence of an own adjustment operation to the other. To avoid this influence, a low-frequency pulse signal generated by the first DC bias corrector 16 and a low-frequency pulse signal generated by the second DC bias corrector 17 are set to have mutually different frequencies, so that one of the signals does not become a harmonic of the other. Further, a bandpass filter is provided before an optical signal detected by the optical output monitor 9 is input to the first DC bias corrector 16 and the second DC bias corrector 17, and the optical signal detected by the optical output monitor 9 can be divided into a signal containing a frequency component of a low-frequency pulse signal generated by the first DC bias corrector 16 and a signal containing a frequency component of a low-frequency pulse signal generated by the second DC bias corrector 17. Furthermore, a time zone for the first DC bias corrector 16 to generate a low-frequency pulse signal can be avoided from overlapping a time zone for the second DC bias corrector 17 to generate a low-frequency pulse signal, that is, respective adjustments can be performed in a time-sharing manner.

Although the first DC bias corrector 16 adjusts a phase rotation amount of the optical phase adjuster 7 by using a low-frequency pulse signal in the first embodiment, a method of adjusting a phase rotation amount of the optical phase adjuster 7 is not limited thereto, and any other methods can be also used.

In the first embodiment, the second DC bias corrector 17 includes both a function of a pulse-signal generating unit that generates a low-frequency pulse signal and a function of a bias corrector that determines a bias signal (that is, an amplification factor) of the first optical amplifier 6a and the second optical amplifier 6b such that a difference between a maximum value and a minimum value of an optical signal detected by the optical output monitor 9 becomes minimum. Alternatively, the second DC bias corrector 17 can include a pulse-signal generating unit and a bias corrector as separate constituent elements.

As described above, in the first embodiment, the first optical amplifier 6a that amplifies an optical signal modulated by the first MZ optical modulator 5a and the second optical amplifier 6b that amplifies an optical signal modulated by the second MZ optical modulator 5b are provided. The second DC bias corrector 17 superimposes a low-frequency pulse signal on a bias signal that determines an amplification factor in the first optical amplifier 6a and on a bias signal that determines an amplification factor in the second optical amplifier 6b. The second DC bias corrector 17 determines a bias signal to be input to the first optical amplifier 6a (that is, an amplification factor in the first optical amplifier 6a) and a bias signal to be input to the second optical amplifier 6b (that is, an amplification factor in the second optical amplifier 6b) such that a difference between a maximum value and a minimum value of an optical signal detected by the optical output monitor 9 becomes minimum. Therefore, even when a loss of a sub-modulator is large and the loss varies, a loss of an optical modulator can be decreased, and a difference between an amplitude level of an optical modulation signal in the I channel and an amplitude level of an optical modulation signal in the Q channel can be set at a constant level or smaller.

Figure 5A:
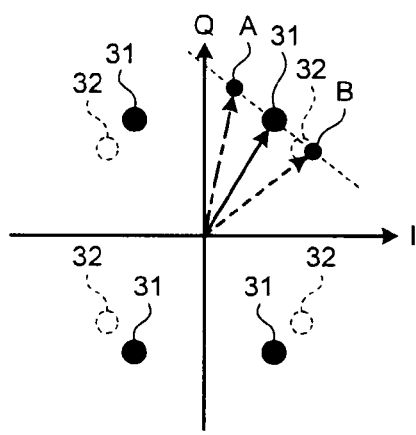
FIG. 5A is an example of a position of a signal point when a low-frequency pulse signal is superimposed.
Figure 5B:
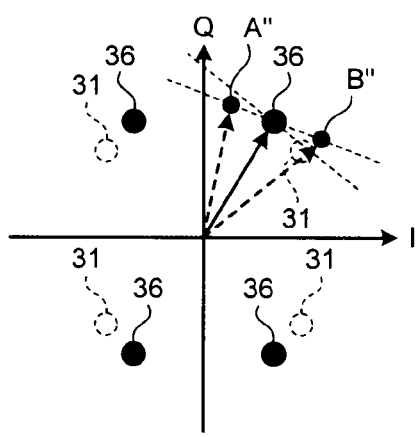
FIG. 5B is an example of a position of a signal point mistakenly adjusted when a change rate of a bias signal amplification factor input to the first optical amplifier is not equal to a change rate of a bias signal amplification factor input to the second optical amplifier.

FIGS. 5A and 5B are schematic diagram for explaining a bias adjusting method of an optical modulator according to a second embodiment of the present invention. The configuration of the optical modulator according to the second embodiment is identical to that of the optical modulator according to the first embodiment. Constituent elements in the second embodiment having identical functions to those of the first embodiment are denoted by like reference numerals in the first embodiment, and redundant explanations thereof will be omitted. Features in the second embodiment different from those in the first embodiment are explained below.

In the first embodiment, a method of compensating for an amplitude by superimposing a complementary pulse signal on a bias signal to be input to the first optical amplifier 6a and the second optical amplifier 6b is explained. When a change rate of an amplification factor of a bias signal input to the first optical amplifier 6a is different from a change rate of an amplification factor of a bias signal input to the second optical amplifier 6b, a correct compensation is not performed in some cases.

FIG. 5A is an example of a position of a signal point when a low-frequency pulse signal is superimposed on a bias signal to be input to the first optical amplifier 6a and on a bias signal to be input to the second optical amplifier 6b, in a similar manner to that of the first embodiment. In FIG. 5A, like in FIG. 3A, the data points 31 are an example of points showing on the IQ plane output amplitude levels of an optical signal detected by the optical output monitor 9 when low-frequency pulse signals are not superimposed before amplification factors are adjusted, and the data points 32 shown by dotted-line circles show optimal data points. In a similar manner to that of the example of FIG. 3A, when a low-frequency pulse signal is superimposed, a data point corresponding to the data point 31 at an upper right position alternately moves between the pulse-modulation data point A and the pulse-modulation data point B.

FIG. 5A is an example in that a change rate of an amplification factor of a bias signal input to the first optical amplifier 6a is equal to a change rate of an amplification factor of a bias signal input to the second optical amplifier 6b. When the amplification factor in the first optical amplifier 6a is equal to the amplification factor in the second optical amplifier 6b, the magnitude of changes in the amplification factors generated by complementary low-frequency pulse signals becomes equal. In this case, a distance between the pulse-modulation data point A and the upper-right data point 31 becomes equal to a distance between the pulse-modulation data point B and the upper-right data point 31. Therefore, as shown in FIG. 3B in the first embodiment, an amplitude level of the optical modulation signal in the I channel becomes equal to an amplitude level of the optical modulation signal in the Q channel by adjusting such that a distance between the pulse-modulation data point A' and the origin becomes equal to a distance between the pulse-modulation data point B' and the origin.

On the other hand, when a change rate of an amplification factor of a bias signal input to the first optical amplifier 6a is not equal to a change rate of an amplification factor of a bias signal input to the second optical amplifier 6b, the magnitude of changes in the amplification factors generated by complementary low-frequency pulse signals becomes different. This is because low-frequency pulse signals of the same amplitude level are superimposed on bias signals, the ratio of an amplitude of a low-frequency pulse signal to the magnitude of an original bias signal in the first optical amplifier 6a is different from that in the second optical amplifier 6b.

FIG. 5B is an example of a position of a signal point mistakenly adjusted when a change rate of an amplification factor of a bias signal input to the first optical amplifier 6a is not equal to a change rate of an amplification factor of a bias signal input to the second optical amplifier 6b. Data points 36 show, like in the first embodiment, data points obtained by adjusting bias signals such that a difference between a maximum value and a minimum value of an optical signal detected by the optical output monitor 9 becomes minimum by superimposing a complementary low-frequency pulse signal on a bias signal input to the first optical amplifier 6a and on a bias signal input to the second optical amplifier 6b when an amplification factor in the first optical amplifier 6a is not equal to an amplification factor in the second optical amplifier 6b. When the bias signal input to the first optical amplifier 6a and the bias signal input to the second optical amplifier 6b are adjusted to obtain the data points 36, and when complementary low-frequency pulse signals are superimposed, a data point corresponding to the data point 36 at an upper right position alternately moves between a pulse-modulation data point A" and a pulse-modulation data point B".

Although a distance between the pulse-modulation data point A" and the origin is equal to a distance between the pulse-modulation data point B" and the origin, the data points 36 after adjustments do not match the optimal data points 32. When a change rate of an amplification factor of a bias signal input to the first optical amplifier 6a is not equal to a change rate of an amplification factor of a bias signal input to the second optical amplifier 6b, data points are not adjusted to the optimal data points 32 in this way in some cases.

Figure 6A:
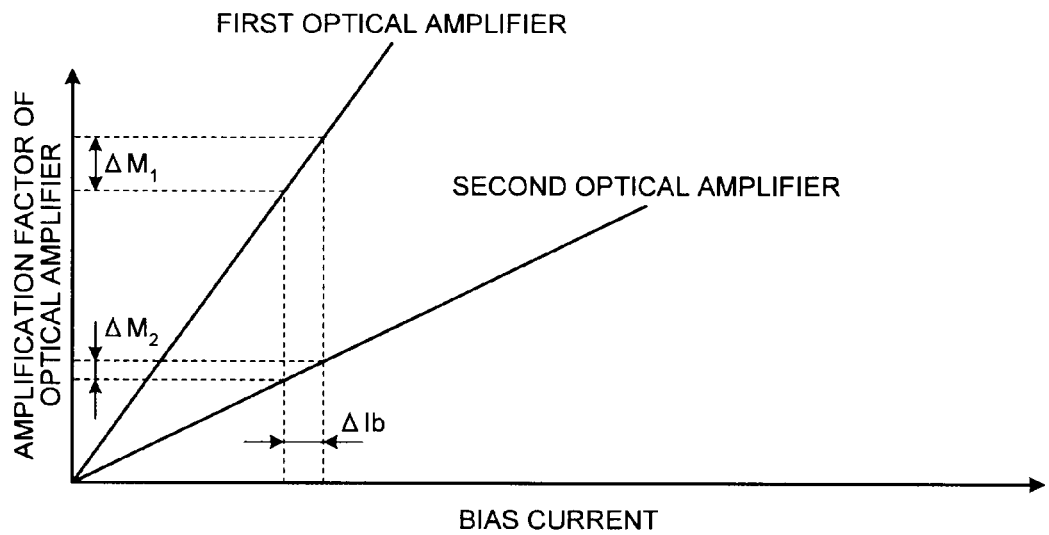
FIG. 6A is an example of amplification factors in the first optical amplifier and the second optical amplifier to an input bias current.

FIG. 6A is an example of amplification factors in the first optical amplifier 6a and the second optical amplifier 6b to a bias current (a bias signal) input. As shown in FIG. 6A, a change rate of an amplification factor of a bias signal input to the first optical amplifier 6a is different from a change rate of an amplification factor of a bias signal input to the second optical amplifier 6b (that is, inclinations of two straight lines shown in FIG. 6A are different from each other). In this case, when a bias current is changed by $\Delta Ib$, an amplification factor changes by $\Delta M_1$ in the first optical amplifier 6a, and an amplification factor changes by $\Delta M_2$ in the second optical amplifier 6b ($\Delta M_1 > \Delta M_2$ in the example shown in FIG. 6A). Therefore, for an amount of the change $\Delta Ib$ of the same bias current, an amplification factor in the first optical amplifier 6a changes more than an amplification factor in the second optical amplifier 6b. Consequently, even when bias signals are adjusted such that a distance between the first optical amplifier 6a and the origin becomes equal to a distance between the second optical amplifier 6b and the origin when complementary low-frequency pulse signals are superimposed, data points are not adjusted to the optimal data points 32.

In the second embodiment, an amplitude of a superimposed low-frequency pulse signal is adjusted based on a characteristic (for example, a characteristic shown in FIG. 6A) of an amplification factor to a bias current input to the first optical amplifier 6a and the second optical amplifier 6b, respectively. Therefore, an adjustment error attributable to a change rate of an amplification factor of a bias signal input to the first optical amplifier 6a and a change rate of an amplification factor of a bias signal input to the second optical amplifier 6b as described above is prevented.

Figure 6B:
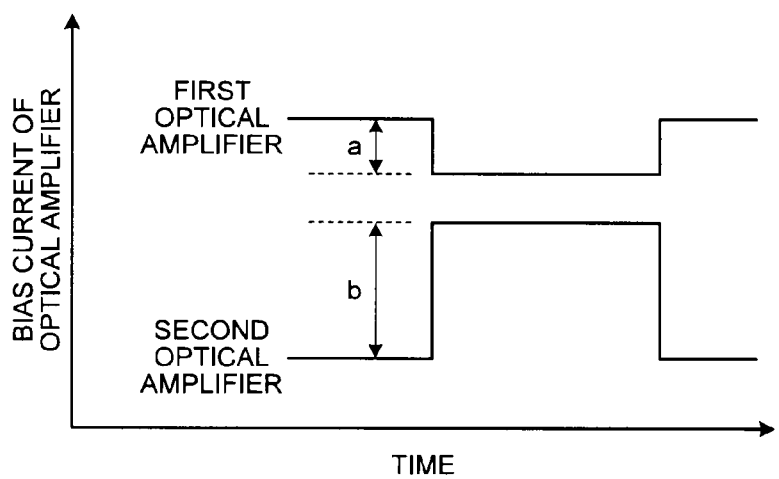
FIG. 6B is an example of a low-frequency pulse signal superimposed on a first optical amplifier and a second optical amplifier according to a second embodiment of the present invention.

FIG. 6B is an example of a low-frequency pulse signal superimposed on the first optical amplifier 6a and the second optical amplifier 6b according to the second embodiment. When complementary low-frequency pulse signals are generated, the second DC bias corrector 17 generates low-frequency pulse signals such that the ratio of an amplitude "a" of a low-frequency pulse signal (a low-frequency pulse signal superimposed on a bias signal input to the first optical amplifier 6a), which is input to the fourth DC bias controller 14, to an amplitude "b" of a low-frequency pulse signal (a low-frequency pulse signal superimposed on a bias signal input to the second optical amplifier 6b), which is input to the fifth DC bias controller 15, becomes an inverse number of the ratio of $\Delta M_1$ to $\Delta M_2$. That is, the ratio of the amplitude "a" to the amplitude "b" is set to become an inverse number of the ratio, which is a ratio of a change rate of a bias current amplification factor in the first optical amplifier 6a to a change rate of a bias current amplification factor in the second optical amplifier 6b.

By the above arrangement, even when a change rate of an amplification factor of a bias signal input to the first optical amplifier 6a is different from a change rate of an amplification factor of a bias signal input to the second optical amplifier 6b, the magnitude of a change of an amplification factor in the first optical amplifier 6a can be set equal to the magnitude of a change of an amplification factor in the second optical amplifier 6b, when low-frequency pulse signals are superimposed. Thus, data points can be adjusted to the optimal data points 32. Operations in the second embodiment other than those described above are identical to those in the first embodiment.

As described above, in the second embodiment, the ratio of the amplitude "a" of a low-frequency pulse signal superimposed on a bias signal input to the first optical amplifier 6a to the amplitude "b" of a low-frequency pulse signal superimposed on a bias signal input to the second optical amplifier 6b is set to become an inverse number of the ratio of a change rate of a bias current amplification factor in the first optical amplifier 6a to a change rate of a bias current amplification factor in the second optical amplifier 6b. Therefore, effects identical to those of the first embodiment can be obtained even when a change rate of an amplification factor to a bias signal, which is input to the first optical amplifier 6a, is different from a change rate of an amplification factor to a bias signal, which is input to the second optical amplifier 6b.

FIG. 7 is a functional configuration example of an optical modulating unit of an optical modulator according to a third embodiment of the present invention. The configuration of the optical modulator according to the third embodiment is identical to that of the optical modulator according to the first embodiment, except that the optical modulating unit 2 according to the first embodiment is replaced by the optical modulating unit according to the third embodiment. Constituent elements in the third embodiment having identical functions to those of the first embodiment are denoted by like reference numerals in the first embodiment, and redundant explanations thereof will be omitted. Features in the third embodiment different from those in the first embodiment are explained below.

In the first embodiment, the first optical amplifier 6a and the second optical amplifier 6b are provided at latter stages of the first MZ optical modulator 5a and the second MZ optical modulator 5b, respectively. In the third embodiment, optical amplifiers are provided next to modulation arms that constitute MZ optical modulators.

As shown in FIG. 7, the optical modulating unit according to the third embodiment is configured by a first MZ optical modulator 21a, a second MZ optical modulator 21b, the optical phase adjuster 7, the optical multiplexer 8, and the optical output monitor 9. The optical phase adjuster 7, the optical multiplexer 8, and the optical output monitor 9 are identical to the optical phase adjuster 7, the optical multiplexer 8, and the optical output monitor 9 according to the first embodiment.

An I-channel modulation signal input from the IQ signal generator 10 and a bias signal input from the first DC bias controller 11 are input to a first modulation arm 24a and a second modulation arm 24b. A Q-channel modulation signal input from the IQ signal generator 10 and a bias signal input from the second DC bias controller 12 are input to a third modulation arm 24c and a fourth modulation arm 24d.

In the third embodiment, two kinds of bias signals for a first optical amplifier 25a and a second optical amplifier 25b are input from the fourth DC bias controller 14 to the first optical amplifier 25a and the second optical amplifier 25b, respectively. Similarly, two kinds of bias signals for a third optical amplifier 25c and a fourth optical amplifier 25d are input from the fifth DC bias controller 15 to the third optical amplifier 25c and the fourth optical amplifier 25d, respectively. The fourth DC bias controller 14 can be configured to include a functional unit that generates a bias signal for the first optical amplifier 25a, and a functional unit that generates a bias signal for the second optical amplifier 25b. Similarly, the fifth DC bias controller 15 can be configured to include a functional unit that generates a bias signal for the third optical amplifier 25c, and a functional unit that generates a bias signal for the fourth optical amplifier 25d.

An optical demultiplexing unit 22a branches an optical signal input from the optical demultiplexing unit 3 into two signals, outputs one of the branched optical signals to the first modulation arm 24a via an optical waveguide 23a, and outputs the other branched optical signal to the second modulation arm 24b via an optical waveguide 23b. The first modulation arm 24a modulates an input optical signal and outputs the modulated signal to the first optical amplifier 25a, based on an I-channel modulation signal input from the IQ signal generator 10 and a bias signal input from the first DC bias controller 11. The second modulation arm 24b modulates an input optical signal to have a phase inverse to that of the first modulation arm 24a and outputs the modulated signal to the second optical amplifier 25b, based on an I-channel modulation signal input from the IQ signal generator 10 and a bias signal input from the first DC bias controller 11. The first optical amplifier 25a and the second optical amplifier 25b amplify optical signals output from the first modulation arm 24a and the second modulation arm 24b, respectively, and output the amplified signals to an optical multiplexer 26a. The optical multiplexer 26a multiplexes the optical signals output from the first optical amplifier 25a and the second optical amplifier 25b, and outputs the multiplexed optical signal to the optical multiplexer 8.

An optical demultiplexing unit 22b branches an optical signal input from the optical demultiplexing unit 3 into two signals, outputs one of the branched optical signals to the third modulation arm 24c via an optical waveguide 23c, and outputs the other branched optical signal to the fourth modulation arm 24d via an optical waveguide 23d. The third modulation arm 24c modulates an input optical signal and outputs the modulated signal to the third optical amplifier 25c, based on a Q-channel modulation signal input from the IQ signal generator 10 and a bias signal input from the second DC bias controller 12. The fourth modulation arm 24d modulates an input optical signal so as to have a phase inverse to that of the third modulation arm 24c and outputs the modulated signal to the fourth optical amplifier 25d, based on a Q-channel modulation signal input from the IQ signal generator 10 and a bias signal input from the second DC bias controller 12. The third optical amplifier 25c and the fourth optical amplifier 25d amplify optical signals output from the third modulation arm 24c and the fourth modulation arm 24d, respectively, and output the amplified signals to an optical multiplexer 26b. The optical multiplexer 26b multiplexes optical signals output from the third optical amplifier 25c and the fourth optical amplifier 25d, and outputs the multiplexed optical signal to the optical phase adjuster 7.

While the adjusting method of a bias current in the third embodiment is identical to that in the first embodiment, in the third embodiment, the second DC bias controller 12 has optical amplifiers provided next to modulation arms. Therefore, amplification factors in four optical amplifiers of the first optical amplifier 25a to the fourth optical amplifier 25d are adjusted, respectively.

Specifically, for example, complementary low-frequency pulse signals are first superimposed on bias signals to be input to the first optical amplifier 25a and the third optical amplifier 25c, and the bias signals to be input to the first optical amplifier 25a and the third optical amplifier 25c are adjusted such that a difference between a maximum value and a minimum value of an optical signal detected by the optical output monitor 9 becomes minimum, in a similar manner to that of the first embodiment. Thereafter, complementary low-frequency pulse signals are superimposed on bias signals to be input to the first optical amplifier 25a and the second optical amplifier 25b, and the bias signal to be input to the second optical amplifier 25b is adjusted such that a difference between a maximum value and a minimum value of an optical signal detected by the optical output monitor 9 becomes minimum, in a similar manner to that of the first embodiment. At the same time, complementary low-frequency pulse signals having frequencies different from those of complementary low-frequency pulse signals superimposed on bias signals to be input to the first optical amplifier 25a and the second optical amplifier 25b are superimposed on bias signals to be input to the third optical amplifier 25c and the fourth optical amplifier 25d, and the bias signal to be input to the fourth optical amplifier 25d is adjusted such that a difference between a maximum value and a minimum value of an optical signal detected by the optical output monitor 9 becomes minimum.

Furthermore, for example, complementary low-frequency pulse signals are first superimposed on bias signals to be input to the first optical amplifier 25a and the third optical amplifier 25c, and the bias signals to be input to the first optical amplifier 25a and the third optical amplifier 25c are adjusted such that a difference between a maximum value and a minimum value of an optical signal detected by the optical output monitor 9 becomes minimum, in a similar manner to that of the first embodiment. Thereafter, complementary low-frequency pulse signals are superimposed on bias signals to be input to the first optical amplifier 25a and the second optical amplifier 25b, and the bias signal to be input to the second optical amplifier 25b is adjusted such that a difference between a maximum value and a minimum value of an optical signal detected by the optical output monitor 9 becomes minimum, in a similar manner to that of the first embodiment. Next, complementary low-frequency pulse signals are superimposed on bias signals to be input to the third optical amplifier 25c and the fourth optical amplifier 25d, and the bias signal to be input to the fourth optical amplifier 25d is adjusted such that a difference between a maximum value and a minimum value of an optical signal detected by the optical output monitor 9 becomes minimum, in a similar manner to that of the first embodiment. Any other methods can be also used to perform the adjustment so long as the method is to adjust the first optical amplifier 25a to the fourth optical amplifier 25d such that amplitude levels of optical signals output from the first optical amplifier 25a to the fourth optical amplifier 25d become equal.

In the third embodiment, although the first MZ optical modulator 21a and the second MZ optical modulator 21b are provided, the first MZ optical modulator 5a and the first optical amplifier 6a according to the first embodiment can be provided instead of the first MZ optical modulator 21a, or the second MZ optical modulator 5b and the second optical amplifier 6b can be provided instead of the second MZ optical modulator 21b. In this case, it can be determined whether to provide an optical amplifier at a latter stage of the MZ optical modulator like in the first embodiment or to provide an optical amplifier for each modulation arm within the MZ optical modulator like in the third embodiment, depending on whether a difference of a loss between modulation arms within the MZ optical modulator is small, for example.

Also in the third embodiment, when change rates of bias current amplification factors are different between optical amplifiers, the ratio of amplitudes of complementary low-frequency pulse signals input by superimposing bias signals on two optical amplifiers can be set to become an inverse number of the ratio of respective change factors, as described in the second embodiment.

As explained above, in the third embodiment, optical amplifiers (the first optical amplifier 25a to the fourth optical amplifier 25d) are provided next to modulation arms, for modulation arms within the first MZ optical modulator 21a and the second MZ optical modulator 21b, respectively. The second DC bias controller 12 superimposes complementary low-frequency pulse signals on bias signals to be input to two optical amplifiers, and adjusts amplification factors in the optical amplifiers such that a difference between a maximum value and a minimum value of an optical signal detected by the optical output monitor 9 becomes minimum, thereby determining amplification factors between the first MZ optical modulator 21a and the second MZ optical modulator 21b and between modulation arms within each MZ optical modulator. Therefore, effects identical to those in the first embodiment are obtained, loss differences between modulation arms can be compensated for, and improvement in the transmission waveform quality can be expected.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical modulator comprising:
    a first optical modulating unit that generates a first optical modulation signal;
    a second optical modulating unit that generates a second optical modulation signal;
    a first optical amplifying unit that amplifies the first optical modulation signal at an amplification factor based on a first bias signal to be input;
    a second optical amplifying unit that amplifies the second optical modulation signal at an amplification factor based on a second bias signal to be input;
    an optical phase adjuster that rotates a phase of the optical modulation signal, which is amplified by the second optical amplifying unit, by a predetermined rotation amount and outputs the rotated optical modulation signal;
    an optical multiplexing unit that multiplexes an optical modulation signal amplified by the first optical amplifying unit with an optical modulation signal output from the optical phase adjuster, and outputs a multiplexed signal;
    an optical output monitor that detects a multiplexed signal output from the optical multiplexing unit;
    a pulse-signal generating unit that generates a first pulse signal of a predetermined frequency and a second pulse signal that is complementary to the first pulse signal, and outputs generated pulse signals;
    a bias corrector that obtains a first bias value as a value of a first bias signal corresponding to an amplification factor set in the first optical amplifying unit and a second bias value as a value of a second bias signal corresponding to an amplification factor set in the second optical amplifying unit, based on a change of strength of a multiplexed signal detected by the optical output monitor;
    a first bias controller that generates a first bias signal based on the first bias value, superimposes a generated first bias signal with the first pulse signal, and inputs a superimposed signal to the first optical amplifying unit; and
    a second bias controller that generates a second bias signal based on the second bias value, superimposes a generated second bias signal with the second pulse signal, and inputs a superimposed signal to the second optical amplifying unit.

2. The optical modulator according to claim 1, wherein the bias corrector determines the first bias value and the second bias value such that the change of strength becomes minimum.

3. The optical modulator according to claim 1, wherein the bias corrector determines the first bias value and the second bias value such that the change of strength becomes equal to or smaller than a predetermined value.

4. The optical modulator according to claim 1, wherein a ratio of a change rate of an amplification factor in the first optical amplifier to a first bias signal, which is input to the first optical amplifying unit, to a change rate of an amplification factor in the second optical amplifier to a second bias signal, which is input to the second optical amplifying unit, is set as an amplification factor ratio, and
    a ratio of an amplitude of the first pulse signal to an amplitude of the second pulse signal is set as an inverse number of the amplification factor ratio.

5. The optical modulator according to claim 1, wherein the first modulating unit and the second modulating unit are Mach-Zehnder interferometers.

6. An optical modulator comprising:
    a first optical modulating unit as a Mach-Zehnder interferometer that generates a first optical modulation signal;
    a second optical modulating unit as a Mach-Zehnder interferometer that generates a second optical modulation signal;
    an optical phase adjuster that rotates a phase of the second optical modulation signal by a predetermined amount and outputs the rotated second optical modulation signal; and
    an optical multiplexing unit that multiplexes the first optical modulation signal with an optical modulation signal output from the optical phase adjuster, and outputs a multiplexed signal, wherein
    the first optical modulating unit includes:
    a first modulation arm that forms a Mach-Zehnder interferometer;
    a second modulation arm that forms a Mach-Zehnder interferometer;
    a first optical amplifying unit that amplifies an optical modulation signal, which is output from the first modulation arm, at an amplification factor based on a first bias signal to be input; and
    a second optical amplifying unit that amplifies an optical modulation signal, which is output from the second modulation arm, at an amplification factor based on a second bias signal to be input, and
    the second optical modulating unit includes:
    a third modulation arm that forms a Mach-Zehnder interferometer;
    a fourth modulation arm that forms a Mach-Zehnder interferometer;
    a third optical amplifying unit that amplifies an optical modulation signal, which is output from the third modulation arm, at an amplification factor based on a third bias signal to be input; and
    a fourth optical amplifying unit that amplifies an optical modulation signal, which is output from the fourth modulation arm, at an amplification factor based on a fourth bias signal to be input, the optical modulator further comprises:

an optical output monitor that detects a multiplexed signal output from the optical multiplexing unit;

a pulse-signal generating unit that generates a first pulse signal of a predetermined frequency and a second pulse signal that is complementary to the first pulse signal, and outputs generated pulse signals;

a bias corrector that obtains, based on a change of strength of a multiplexed signal detected by the optical output monitor, a first bias value as a value of a first bias signal corresponding to an amplification factor set in the first optical amplifying unit, a second bias value as a value of a second bias signal corresponding to an amplification factor set in the second optical amplifying unit, a third bias value as a value of a third bias signal corresponding to an amplification factor set in the third optical amplifying unit, and a fourth bias value as a value of a fourth bias signal corresponding to an amplification factor set in the fourth optical amplifying unit;

a first bias controller that generates a first bias signal based on the first bias value, and inputs the first bias signal to the first optical amplifying unit;

a second bias controller that generates a second bias signal based on the second bias value, and inputs the second bias signal to the second optical amplifying unit;

a third bias controller that generates a third bias signal based on the third bias value, and inputs the third bias signal to the third optical amplifying unit; and a fourth bias controller that generates a fourth bias signal based on the fourth bias value, and inputs the fourth bias signal to the fourth optical amplifying unit, the bias corrector inputs the first pulse signal to at least one of the first bias controller, the second bias controller, the third bias controller, and the fourth bias controller, and inputs the second pulse signal to at least one of the first bias controller, the second bias controller, the third bias controller, and the fourth bias controller to which the first pulse signal is not input, and the first bias controller, the second bias controller, the third bias controller, and the fourth bias controller superimpose the first pulse signal or the second pulse signal on a bias signal generated by the own bias controller, respectively, when the first pulse signal or the second pulse signal is input.

7. An optical transmission device comprising an optical modulator that includes:

a first optical modulating unit that generates a first optical modulation signal;

a second optical modulating unit that generates a second optical modulation signal;

a first optical amplifying unit that amplifies the first optical modulation signal at an amplification factor based on a first bias signal to be input;

a second optical amplifying unit that amplifies the second optical modulation signal at an amplification factor based on a second bias signal to be input;

an optical phase adjuster that rotates a phase of the optical modulation signal, which is amplified by the second optical amplifying unit, by a predetermined rotation amount and outputs the rotated optical modulation signal;

an optical multiplexing unit that multiplexes an optical modulation signal amplified by the first optical amplifying unit with an optical modulation signal output from the optical phase adjuster, and outputs a multiplexed signal;

an optical output monitor that detects a multiplexed signal output from the optical multiplexing unit;

a pulse-signal generating unit that generates a first pulse signal of a predetermined frequency and a second pulse signal that is complementary to the first pulse signal, and outputs generated pulse signals;

a bias corrector that obtains a first bias value as a value of a first bias signal corresponding to an amplification factor set in the first optical amplifying unit and a second bias value as a value of a second bias signal corresponding to an amplification factor set in the second optical amplifying unit, based on a change of strength of a multiplexed signal detected by the optical output monitor;

a first bias controller that generates a first bias signal based on the first bias value, superimposes a generated first bias signal with the first pulse signal, and inputs a superimposed signal to the first optical amplifying unit; and a second bias controller that generates a second bias signal based on the second bias value, superimposes a generated second bias signal with the second pulse signal, and inputs a superimposed signal to the second optical amplifying unit.

8. A bias adjusting method comprising:

generating, a first optical modulation signal;

generating, a second optical modulation signal;

amplifying, the first optical modulation signal at an amplification factor based on a first bias signal to be input;

amplifying, the second optical modulation signal at an amplification factor based on a second bias signal to be input;

outputting, an optical modulation signal amplified at the amplifying of the second optical modulation signal, after rotating a phase of the optical modulation signal by a predetermined amount;

multiplexing, an optical modulation signal amplified at the amplifying of the first optical modulation signal with an optical modulation signal output at the outputting, to output a multiplexed signal;

detecting, a multiplexed signal output at the multiplexing;

generating, a first pulse signal of a predetermined frequency and a second pulse signal that is complementary to the first pulse signal, to output the generated pulse signals;

obtaining, a first bias value as a value of a first bias signal corresponding to an amplification factor set in a first optical amplifying unit and a second bias value as a value of a second bias signal corresponding to an amplification factor set in a second optical amplifying unit, based on a change of strength of a multiplexed signal detected at the detecting;

generating, a first bias signal based on the first bias value, superimposing, a generated first bias signal with the first pulse signal, and inputting, a superimposed signal to the first optical amplifying unit; and generating, a second bias signal based on the second bias value, superimposing, a generated second bias signal with the second pulse signal, and inputting, a superimposed signal to the second optical amplifying unit.

9. A bias adjusting method of an optical modulator, the optical modulator comprising:

a first optical modulating unit as a Mach-Zehnder interferometer that generates a first optical modulation signal and includes a first modulation arm and a second modulation arm;

a second optical modulating unit as a Mach-Zehnder interferometer that generates a second optical modulation signal and includes a third modulation arm and a fourth modulation arm;

an optical phase adjuster that outputs the second optical modulation signal by rotating a phase of the second optical modulation signal by a predetermined amount; and an optical multiplexing unit that multiplexes the first optical modulation signal with an optical modulation signal output from the optical phase adjuster, and outputs a multiplexed signal, wherein the bias adjusting method comprises:

amplifying, an optical modulation signal output from the first modulation arm at an amplification factor based on a first bias signal to be input;

amplifying, an optical modulation signal output from the second modulation arm at an amplification factor based on a second bias signal to be input;

amplifying, an optical modulation signal output from the third modulation arm at an amplification factor based on a third bias signal to be input;

amplifying, an optical modulation signal output from the fourth modulation arm at an amplification factor based on a fourth bias signal to be input;

detecting, a multiplexed signal output from the optical multiplexing unit;

generating, a first pulse signal of a predetermined frequency and a second pulse signal that is complementary to the first pulse signal, to output the generated pulse signals;

obtaining, based on a change of strength of a multiplexed signal detected at the detecting, a first bias value as a value of a first bias signal corresponding to an amplification factor set in a first optical amplifying unit, a second bias value as a value of a second bias signal corresponding to an amplification factor set in a second optical amplifying unit, a third bias value as a value of a third bias signal corresponding to an amplification factor set in a third optical amplifying unit, and a fourth bias value as a value of a fourth bias signal corresponding to an amplification factor set in a fourth optical amplifying unit;

generating, a first bias signal based on the first bias value to input the first bias signal to the first optical amplifying unit;

generating, a second bias signal based on the second bias value to input the second bias signal to the second optical amplifying unit;

generating, a third bias signal based on the third bias value to input the third bias signal to the third optical amplifying unit;

generating, a fourth bias signal based on the fourth bias value to input the fourth bias signal to the fourth optical amplifying unit;

inputting, the first pulse signal to at least one of a first bias controller that generates the first bias signal, a second bias controller that generates the second bias signal, a third bias controller that generates the third bias signal, and a fourth bias controller that generates the fourth bias signal, and inputting the second pulse signal to at least one of the first bias controller, the second bias controller, the third bias controller, and the fourth bias controller to which the first pulse signal is not input; and superimposing, the first pulse signal or the second pulse signal on a bias signal generated by the first bias controller, the second bias controller, the third bias controller, and the fourth bias controller, when the first pulse signal or the second pulse signal is input thereto.

* * * * *